United States Patent [19]

Park et al.

[11] Patent Number: 4,529,844
[45] Date of Patent: Jul. 16, 1985

[54] PULSE OUTPUT TELEPHONE SYSTEM WITH RING TAP ELIMINATION

[75] Inventors: Young-Soon Park; Kum-Dong Yoon, both of Seoul, Rep. of Korea

[73] Assignee: Dong Jun Industrial Co., Ltd., Rep. of Korea

[21] Appl. No.: 535,583

[22] Filed: Sep. 26, 1983

[51] Int. Cl.³ ............................................. H04M 1/74
[52] U.S. Cl. .............................. 179/84 SS; 179/84 R
[58] Field of Search .............. 179/84 SS, 17 B, 17 E, 179/84 R, 84 C

[56] References Cited

U.S. PATENT DOCUMENTS 4,152,549  5/1979  Ceruti et al. ..................... 179/84 R
4,213,012  7/1980  Carroll et al. ..................... 179/84 R Primary Examiner—Gene Z. Rubinson
Assistant Examiner—James L. Dwyer
Attorney, Agent, or Firm—Dressler, Goldsmith, Shore, Sutker & Milnamow, Ltd.

[57] ABSTRACT

Telephone station apparatus having ring tap elimination circuitry is provided. The ringers of secondary or extension telephones connected to the same telephone line as a first telephone, the first telephone being in an off-hook position and being dialed, are bypassed during dialing of the first phone, to prevent ring tap. The output of a bridge circuit provides the threshold switching signal for a pair of switching transistors, effectively limited by a zener diode and resistor combination. The lower voltage and/or frequency of the dial output pulses effectively signals the switching transistor combination to allow the signal to bypass the ringer of parallel connected extension telephones. Alternatively, the same circuitry allows signal flow through the ringer during transmission of a higher voltage and/or frequency signal, produced in response to an incoming call being present on the telephone line.

13 Claims, 1 Drawing Figure

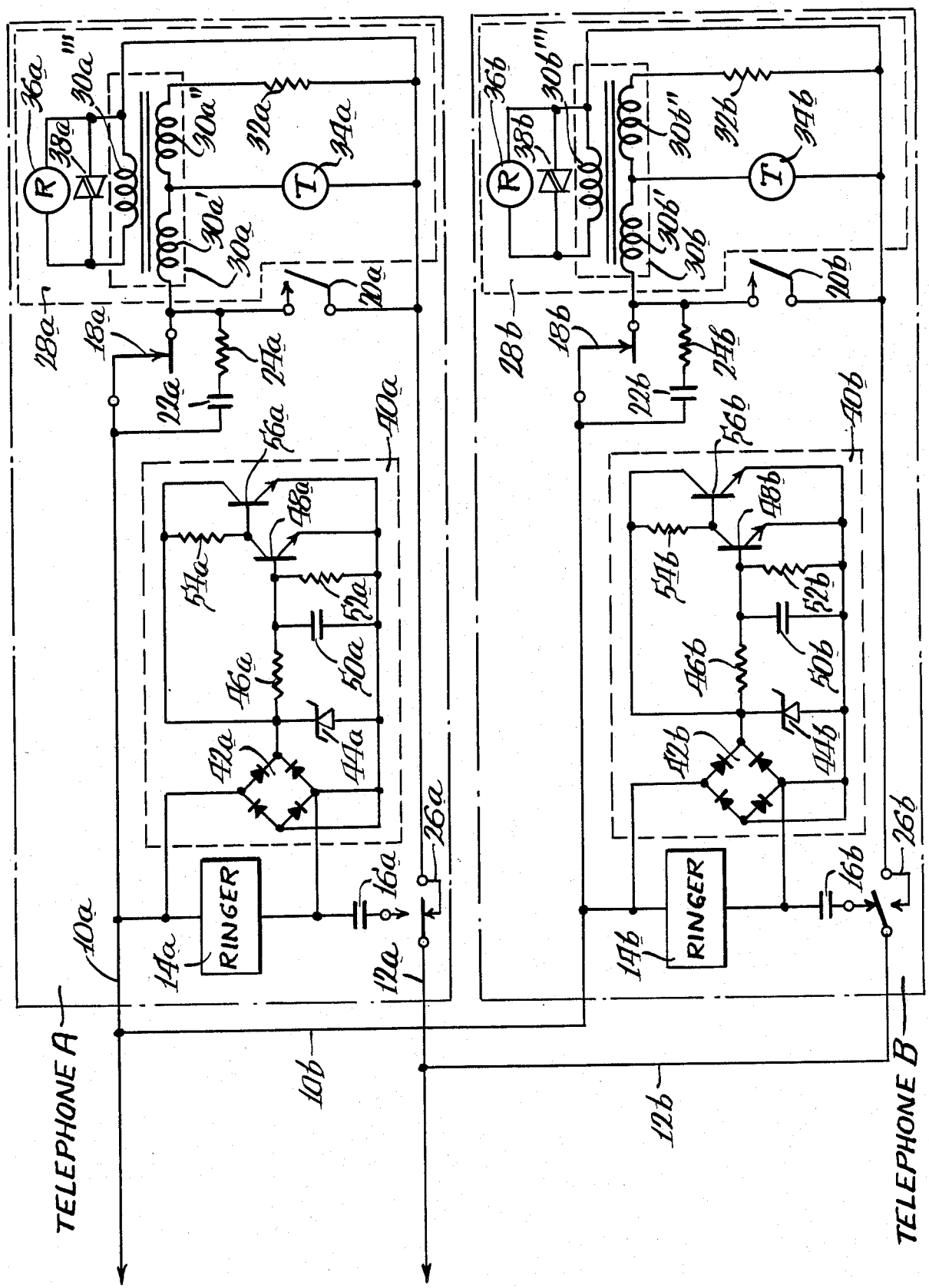

PULSE OUTPUT TELEPHONE SYSTEM WITH RING TAP ELIMINATION

TECHNICAL FIELD OF THE INVENTION

The present invention relates to telephone station apparatus and more particularly to ring tap elimination systems for use in conjunction with telephone station apparatus.

BACKGROUND OF THE INVENTION

In recent years, multiple telephone station apparatus has become prevalent. Connection of several telephone station apparatus to one telephone line, facilitating positioning an extension telephone in several locations for convenience of use, has dramatically increased. One type of telephone station for use in connection with telephone lines comprises a pulse output type telephone station. Such devices may take the form of rotary dial mechanisms or a push-button dial assembly for keying the telephone to produce pulse outputs corresponding to the number dialed. The pulse outputs occur through interruption of a d.c. line voltage supplied through the telephone line to the telephone station. Each number (1-9) is dialed by producing a corresponding number of interruptions of the d.c. line, with zero produced by ten interruptions of the d.c. line voltage.

The use of more than one telephone station apparatus or hand set on a single pair of lines may create a problem known as "ring tap". Ring tap occurs on a phone during the dialing or keying of another, pulse output type phone connected to the same telephone lines. This causes the additional phones or extensions connected to the same lines to receive the dial pulses, thereby undesirably actuating the ringer of the other on-hook phones. It would be desirable to eliminate the ring tap that is caused in on-hook telephones, during dialing of another phone connected to the same telephone lines.

One approach to solving the ring tap problem has been the mechanical adjustment of a mechanical ringer used to signal the transmission of an incoming call, such as mechanical adjustment of the ringer or hammer. Such compensation for the ringer tap problem has not been completely satisfactory. Critical space adjustment is often necessary which necessitates increased production quality control to assure effective elimination of the ring tap problem. Increased quality control to assure elimination of ring tap, increases the cost of the telephone station apparatus.

In addition, mechanical adjustments of relative distance of movement and space between the ringer hammer and bells have been satisfactory only when used with dual bell ringer systems. This is due to the fact that the dual bell system allows slower relative movement of the hammer to produce the well-recognized ringing of the telephone station apparatus.

Mechanical adjustments to correct the ring tap problem in single bell ringer systems have not been successful, e.g., because a less rigid ringer hammer is used in order to allow faster movement to produce the well-recognized ringing sound. This lower ridigity in a single bell system makes proper mechanical adjustment difficult if the well-recognized ringing sound is to be produced.

Since the use of a dual bell ringer unduly increases the cost of the telephone station apparatus due to redundancy of components, it would be desirable to eliminate ring tap in single bell telephone systems, while still providing the well-recognized ringing sound.

It would also be highly desirable to be able to eliminate the ring tap problem in both single and dual bell ringer systems without requiring mechanical adjustment of the ringer pendulum and without substantially increasing the cost of the telephone station apparatus.

SUMMARY OF THE INVENTION

The ring tap elimination or ringer control system incorporating the present invention, among other things, substantially eliminates the disadvantages noted above by eliminating the need for precise mechanical adjustment of the ringer hammer. The system of the present invention may be used with dual or single bell systems, as well as electronic ringers which are becoming more and more popular. Further, the versatility of the present invention reduces the expense associated with increased production quality control, and does not add substantially to the cost of the telephone station apparatus.

In accordance with the present invention, a ringer control or ring tap elimination system is provided for preventing unwanted ringing of extension telephones connected to the same telephone line as a first pulse output type telephone when the first pulse output type telephone is dialed and pulse output signals are produced for transmission along the telephone line. Prevention of unwanted ringing eliminates confusion when an extension telephone rings not only in response to and to indicate an incoming outside call but also due to the pulse dialing of an outgoing call from another telephone connected to the same line pair.

More specifically, a phone station incorporating the system of the present invention includes the usual subscriber station network in the form of voice transmitting and receiving circuitry, for transmitting and receiving voice information; a hook switch for disconnecting and connecting the network to the telephone lines in an on-hook and off-hook condition, respectively; and means for "dialing" an outgoing number. For pulse dialing, the number dialing device may take the form of a rotary dial or pushbutton keying assembly, which keys a plurality of pulses to generate the desired number of pulse output signals when the phone is in the off-hook condition. As indicated above, the number of pulse output signals produced correspond to the number dialed by the user.

The phone station or handset also includes a ringer which is adapted to be connected to the telephone line in the on-hook condition and is adapted to be disconnected from the telephone line in the off-hook condition. Ring tap elimination or ringer control circuitry is also provided which is operably associated with the ringer for distinguishing between an incoming ring signal, signaling an incoming call, and pulse output signals produced by dialing one telephone connected to the telephone line pair.

The ring tap elimination or control circuitry incorporating the present invention is frequency sensitive to selectively control operation of the ringer in response to signals applied to the ringer. The ring tap elimination or control circuitry effectively eliminates such intermittent partial ringing of extension telephones by inhibiting operation of the ringer in response to pulses produced as a result of keying or dialing from another, pulse output type telephone connected to the same telephone lines while permitting normal operation of the ringer in response to incoming ring signals.

Notably, the present ring tap elimination or control system is adapted to be included with currently produced telephone station apparatus at a minimum of cost. Further, the present system may be retrofitted to previously manufactured telephone station apparatus with a minimum of complexity and cost, while producing a high degree of reliability in eliminating the ring tap problem.

Numerous other advantages and features of the present invention will become readily apparent from the following detailed description of the invention and of one embodiment thereof, from the claims and from the accompanying drawings in which like numerals are employed to designate like parts throughout the same.

BRIEF DESCRIPTION OF THE DRAWING

The one figure is a detailed electrical schematic diagram showing two output pulse type telephone station apparatus connected in parallel to the same telephone line, both incorporating the present ring tap elimination system.

DESCRIPTION OF THE PREFERRED EMBODIMENT

While this invention is susceptible of embodiment in many different forms, there are shown in the drawings and will herein be described in detail an illustrated embodiment of the invention. It should be understood, however, that the present disclosure is to be considered as an exemplification of the principles of the invention and is not intended to limit the invention to the embodiment illustrated.

Although the invention in its broader aspects has many advantageous features and many applications, it will be described in a presently illustrated specific embodiment. The illustrated embodiment is included merely to aid in the understanding of the invention and variations may be made by one skilled in the art without departing from the spirit and the scope of the invention.

The one figure of the drawing is a detailed electrical schematic of two identical telephone hand sets A and B each depicting a pulse output type telephone circuitry incorporating the present ring tap elimination or ring control system. The same numbers are used in the drawing to identify identical components with the numbers for each hand set including the letter of the hand set. Only the numbers are used herein except where the two circuits are being referred to separately.

The telephone system includes telephone lines 10 and 12 for transmission of electrical signals to and from each of the telephone station apparatus. Bridging the lines 10 and 12 is a ringer 14 in series with a blocking capacitor 16. The normally closed dial contacts of dial switch 18 and the normally open contacts of muting switch 20 are connected in series across lines 10, 12. Bridging the contacts of dial switch 18 are a capacitor 22 and a resistor 24.

Line 12 has a hook switch 26 connected therein. The hook switch 26 has two positions, an on-hook and off-hook position. In the on-hook position, as shown in the circuit of telephone station B, the circuit from the telephone lines 10, 12 is completed through ringer 14 and capacitor 16 allowing the ringer to be energized when a call is received. Since the signal is normally present on lines 10, 12, is a d.c. signal, capacitor 16 acts to block this signal and inhibit operation of the ringer in the absence of an incoming ring signal.

In the other, off-hook position, as shown in the circuit of telephone station A, the circuit from the telephone lines 10, 12 is completed through normally closed contacts of dial switch 18 and audio circuitry or subscriber station network portion 28. When the dial switch 18 is actuated by the user keying or dialing a number, muting switch 20 closes to bypass audio circuitry 28. Contacts 18 open and close to produce a series of pulses representative of the number being dialed which are transmitted through the telephone lines, 10, 12. It should be understood that mechanical switches 18, 20 can be and have been replaced by other devices or circuits which perform the pulse dialing and muting functions.

The audio circuitry or subscriber station network portion 28 of the telephone station apparatus includes a transformer 30 having two primary windings 30', 30" and one secondary winding 30'''. The primary windings 30', 30", are connected in series with a resistor 32 across muting switch 20. A microphone 34 is connected across winding 30" and resistor 32. The secondary 30''' of transformer 30 is connected to a receiver or earpiece 36. Diodes 38 are connected across secondary 30''' to reduce noise as is known in existing telephone station audio circuitry. Audio circuitry 28 is standard circuitry that operates in the usual manner and forms no part of the present invention. It is shown only for completeness of disclosure Thus, as is well-known, a d.c. line voltage is supplied to the telephone station apparatus by a central office via lines 10 and 12. When the phone is off-hook and a number is dialed, the muting switch 20 closes, to bypass audio circuitry 28. The contacts of dial switch 18 open and close to produce a selected number of pulses which represent the number dialed.

The operation of the dial switch 18 when the hook switch 26 is in the on-hook position does not produce output pulses on the telephone lines 10, 12 since the on-hook position of hook switch 26 disconnects that portion of the circuit from telephone lines 10, 12. When the telephone is on-hook, the hook switch 26 connects the ringer 14 and capacitor 16 across lines 10 and 12 to enable the ringer 14 to be energized or operated by an incoming ring signal on the lines 10, 12. A ring signal on the telephone lines 10, 12 is an a.c. signal.

The two pulse type telephones A and B are shown in the drawing connected in parallel to the same telephone lines 10 and 12. When switch 26a in phone A is in the off-hook position, and phone A is used to dial a number, pulses are sent to the central office over telephone lines 10, 12. Due to the parallel relationship of telephones A and B, these output pulses are also produced in conductors 10b, 12b which connect telephone B to lines 10 and 12.

The output pulses from phone A normally would pass through ringer 14b and capacitor 16b in phone B to energize ringer 14b causing partial, intermittent ringing of ringer 14b of telephone B. Such partial ringing is referred to and is known in the art as "ring tap". Ring tap is an undesirable condition since it can be confusing, falsely signaling that an incoming call is being received.

Accordingly, it is desirable to eliminate ring tap that occurs, in a telephone, such as telephone B connected in parallel to, and on the same telephone line as the telephone being dialed, in this case telephone A. In order to prevent occurrence of ring tap, ring tap elimination or ring control circuitry 40 is provided across ringer 14. The control circuit 40 includes a bridge rectifier 42 connected across ringer 14. The output of bridge rectifier 42 is connected across zener diode 44 which acts to limit the voltage to input resistor 46 connected to the base of control transistor 48. Only ac or pulsed d.c. signals are applied circuit 40 due to the action of blocking capacitor 16.

The pulsed (which of course may result from rectified a.c. signals) charge capacitor 50 which discharges through resistor 52 between pulses. If the frequency of the signal is sufficiently high, capacitor 50b becomes charged to a value sufficient to bias normally off control transistor 48b on. If the frequency is not sufficiently high, capacitor 50b discharges through resister 52b sufficiently between cycles so that transistor 48b is not turned on.

Resister 54 is the load resister for control transister 52, the collector of which is connected to the base of output or switching transistor 56.

As stated before, ringer 14 is part of a circuit between lines 10 and 12 only when the hook switch 26 is in the on-hook condition. Accordingly, the ring control circuitry 40 is also part of the circuit connecting lines 10 and 12 only in the on-hook condition of hook switch 26.

During dialing of telephone A, the pulse output signal produced is present on telephone lines 10b and 12b. Since it is not blocked by capacitor 16b, it appears across ringer 14b and the bridge rectifier 42b of control circuit 40b of telephone B, since hook switch 26b is in the on-hook condition. The typical frequency of the pulsed output signal produced at the bridge rectifier is about 10 Hz, whereas the frequency of a ring signal is greater than 15 Hz. When telephone B is in the on-hook condition, it is in condition to receive a ring signal, signifying that an incoming call is present on telephone lines 10, 12.

The two transistors 48 and 56 together define the "on" or "off" state of the ring control circuit 40, which is responsive to at least one characteristic, i.e., the frequency of, the signal on lines 10, 12. During dialing of telephone A, the output pulses that appear across the bridge rectifier 42b have a frequency no more than about 10 Hz. The output from rectifier 42b, limited by the zener diode 44b, charges capacitor 50b. Because of the low frequency, capacitor 50b discharges through resistor 52b between pulses, and therefore the signal applied to the base of transistor 48b is insufficient to switch transistor 48b on.

Since the signal present at the base of control transistor 48b does not change the normally non-conducting or "off" state of the control transistor 48b, the positive voltage at the collector of the normally "off" control transistor 48b connected to the base of switching transistor 56b, biases transistor 56b to its conducting or "on" state. When transistor 56b is in its "on" state, a circuit is completed across rectifier 42b to short out or by pass the ringer 14b, i.e. to provide a bypass circuit around ringer 14b.

Therefore, the lower frequency signals, such as the 10 Hz output pulses produced by dialing of telephone A, do not result in turning control transistor 52b on. Switching transistor 56b thus conducts to effectively bypass ringer 14b, preventing partial intermittent ringing of telephone B, i.e., preventing ring tap.

When the higher frequency incoming ring signal is present on lines 10, 12, this higher frequency signal respectively charges capacitor 50b before it can discharge. The resulting higher voltage is produced at the base of control transistor 48. The larger voltage is sufficient to bias transistor 48 "on", which in turn causes transistor 56 to turn "off". Transistor 56 being "off", opens the circuit across ringer 14. Therefore the incoming signal passes through ringer 14, causing the ringer to ring as it should, to indicate a call present on the telephone line.

It is also apparent that the voltage of the signal across ringer 14 must be sufficiently high to be able to charge capacitor 50 to its switching valve.

During conversation, ringer 14 is not susceptible to excitation, since the nature of the voice signal does not energize the ringer, i.e., the ringer 14 of an extension phone is not susceptible to ring tap during normal conversations as it is during dialing of another phone connected to the same telephone line.

Thus, a unique ring tap elimination or ring control circuit is provided. The system is cost effective, in that the ring control circuitry may be formed through low cost integrated circuit manufacture. Further, ring control circuitry may be retrofitted and added to previously manufactured output pulse type telephones at minimal cost to the user.

From the foregoing, it will be appreciated that numerous variations and modifications may be effected without departing from the true spirit and scope of the novel concept of the subject invention. It is to be understood that no limitation with respect to the specific apparatus illustrated herein is intended or should be inferred. It is, of course, intended to cover by the appended claims all such modification as fall within the scope of the claims.

What is claimed is:

1. In a telephone system adapted for connection to telephone lines, said telephone station having ringer means capable of being operated in response to certain signals on said telephone lines; a control system for selectively controlling the operation of said ringer means comprising:

means normally operative in response to signals on said telephone lines capable of effecting operation of said ringer means for inhibiting operation of said ringer means;

said inhibiting means including selectively operable switching means connected across said ringer means and normally responsive to said signals for completing a circuit bypassing said ringer means to inhibit operation thereof; and means responsive to selected one of said signals, for controlling said inhibiting means to permit operation of said ringer means in response to said selected ones of said certain signals.

2. A control system as claimed in claim 1 wherein said control means is responsive to a characteristic of said signals for controlling operation of said inhibiting means in response to said characteristic having a selected value.

3. A control system as claimed in claim 1 wherein said control means is responsive to said selected ones of said signals for disabling the operation of said switching means to permit operation of said ringer means in response to said signals.

4. A control system as claimed in claim 3 including input circuit means responsive to said signals for applying a control input to said control means in response to said selected ones of said signals, said control means being responsive to said control input for disabling the operation of said switching means to open said bypass circuit and permit operation of said ringer means.

5. A control system as claimed in claim 4 wherein said input circuit means is responsive to a characteristic of said signals for producing said control input in response to said characteristic exceeding a selected value.

6. A control system as claimed in claim 5 wherein said characteristic of said signals is frequency.

7. A control system as claimed in claim 6, wherein said input circuit means is further responsive to a selected value of second characteristic of said signals, for producing said control input in response both said first and second characteristics of said signals exceeding selected values.

8. In one of a plurality of telephone stations adapted for connection to a common pair of telephone lines in which numbers are dialed by other ones of the telephone stations by production of outgoing dial pulse signals, said one telephone station having ringer means capable of being operated in response to incoming ring signals and outgoing dial pulse signals from the other ones of the telephone sets; a control system for selectively controlling the operation of said ringer means comprising:

means normally operative in response to said incoming ring signals and said outgoing pulse dial signals on said telephone lines for normally inhibiting operation of said ringer means;

said inhibiting means including selectively operable switching means connected across said ringer means and normally responsive to said signals for completing a circuit bypassing said ringer means to inhibit operation thereof; and means responsive to said incoming ring signals for controlling said inhibiting means to permit operation of said ringer means in response thereto.

9. A control system as claimed in claim 8 wherein said control means is responsive to the frequency of said ring signals for controlling operation of said inhibiting means to enable operation of said ringer means.

10. A control system as claimed in claim 8 wherein said control means is responsive to said ringer signals for disabling the operation of said switching means to permit operation of said ringer means in response to said ringer signals.

11. A control system as claimed in claim 3 including input circuit means responsive to said ring signals for applying a control input to said control means in response to said ring signals, said control means being responsive to said control input for disabling the operation of said switching means to open said bypass circuit and permit operation of said ringer means in response to said ring signals.

12. A control system as claimed in claim 11 wherein said input circuit means is responsive to the frequency of said ring signals for producing said control input.

13. A control system as claimed in claim 12, wherein said input circuit means is further responsive to the amplitude of said ring signals, for producing said control input in respose both said frequency and the amplitude of said ring signals for disabling said switching means.

* * * * *